United States Patent
Gladney et al.

(10) Patent No.: US 6,944,110 B2
(45) Date of Patent: Sep. 13, 2005

(54) METHOD AND APPARATUS FOR PROVIDING OPTICAL NETWORK INTERFACE USING OPTICAL MEMORY STORAGE

(75) Inventors: Glenn A. Gladney, Manalapan, NJ (US); Gardy Cadet, Orange, NJ (US); Moncef Tayahi, Holmdel, NJ (US)

(73) Assignee: Digital Software Corporation, Naperville, IL (US)

( * ) Notice: Subject to any disclaimer, the term of this patent is extended or adjusted under 35 U.S.C. 154(b) by 334 days.

(21) Appl. No.: 10/304,178

(22) Filed: Nov. 26, 2002

(65) Prior Publication Data

US 2004/0090899 A1 May 13, 2004

Related U.S. Application Data

(60) Provisional application No. 60/332,949, filed on Nov. 26, 2001.

(51) Int. Cl.[7] .................................................. G11B 7/00
(52) U.S. Cl. ..................................................... 369/103
(58) Field of Search ............................. 369/103, 44.23, 369/44.24, 126, 100

(56) References Cited

U.S. PATENT DOCUMENTS

| | | | |
|---|---|---|---|
| 5,379,285 A | 1/1995 | Sugiura | |
| 5,450,218 A | 9/1995 | Heanue et al. | |
| 5,877,875 A | 3/1999 | Reis et al. | |
| 6,088,321 A | 7/2000 | Yamaji et al. | |
| 6,256,281 B1 * | 7/2001 | Tanaka et al. | 369/103 |
| 6,272,095 B1 | 8/2001 | Liu et al. | |
| 6,320,683 B1 | 11/2001 | Ito et al. | |
| 6,535,472 B1 * | 3/2003 | Lee et al. | 369/103 |

OTHER PUBLICATIONS

International Search Report for PCT US/02/30895 issued Nov. 26, 2002.

OMM Internet data of unknown date—obtained on or about Nov. 22, 2002.

Holographic data storage by J. Ashley et al. vol. 44 No. 3 May 2000.

Holographic Memories; Scientific American, copyright 1995 by Demetri Psaltis and Fai Mok.

* cited by examiner

*Primary Examiner*—Nabil Hindi
(74) *Attorney, Agent, or Firm*—Fitch, Even, Tabin & Flannery

(57) ABSTRACT

Methods and arrangements are disclosed herein for optically storing data from a serial optical bit stream. As each bit of the optical stream is received it is applied to an optical storage medium e.g., lithium niobate, along with a reference beam. The angle of the reference beam is changed in synchronism with the received optical bits to create identifiable interference patterns for each bit.

22 Claims, 12 Drawing Sheets

METHOD AND APPARATUS FOR PROVIDING OPTICAL NETWORK INTERFACE USING OPTICAL MEMORY STORAGE

RELATED APPLICATIONS

The present application claims the benefit of U.S. provisional application 60/332,949 filed Nov. 26, 2001, which is hereby incorporated by reference.

TECHNICAL FIELD

The present invention relates to the optical storage of data with high speed network transmission.

BACKGROUND

As computing and information systems evolve from a central mainframe environment to a client/server arrangement, the bandwidth demands to accomplish the communication between the network for client nodes and the server node(s) has increased dramatically. The dawn of the World Wide Web, has brought about a tremendous increase in file types which are no longer restricted to just ASCII alphanumerical data. Now with audio, video, and graphical file formats being routinely sent, the demand for increasing bandwidth is growing exponentially each year. To help meet this increasing bandwidth demand, network providers are converting from an electrical network to optical networks. It has been shown that optical networks today can reach bandwidth in the Gigabit range and one can expect future technologies to allow bandwidth even in the Terabit ranges.

This increase in bandwidth presents a challenge for continuous real-time storage of information. The highest continuous real-time storage available with the best technology today is through the use of high-speed silicon devices such as Rambus Dynamic Random Access Memory (RDRAM) and Complex Programmable Logic Devices (CPLD). CPLD and RDRAM devices have processing and storage speeds of 2.8 Gigabits per second. This current technology can handle bandwidths up to the OC-48 level of optical networks, which is 2.5 Gigabits per second. However, today's optical networks are providing bandwidths at the OC-192 level or 10 Gigabits per second. Furthermore, optical networks operating at the OC-768 level or 40 Gigabits per second are near reality. Clearly, the gap between what silicon devices can handle electrically and the bandwidth offered by present day optical networks is widening by several factor each year. To meet the challenge of continuous real-time storage of information provided by these optical networks, new devices need to be developed that can store optical information in an optical form.

SUMMARY

In accordance with the methods and arrangements disclosed and claimed herein, data is received as a serial optical stream which is applied to an optical storage medium such as doped lithium niobate (LiNbO3 doped with Fe bulk crystal). As each data bit of the optical stream is applied to the optical storage medium a reference beam is also applied to create interference patterns or gratings in the storage medium. As subsequent data digits are applied the angle at which the reference beam is applied is changed in a predetermined manner to create identifiable interference patterns in the optical storage medium for each bit. The incoming optical data is optically recorded without a conversion between optical and electrical domains. The method and apparatus presented here provide the means for continuous real-time storage of optical information in an optical form.

DESCRIPTION

Figure 1:
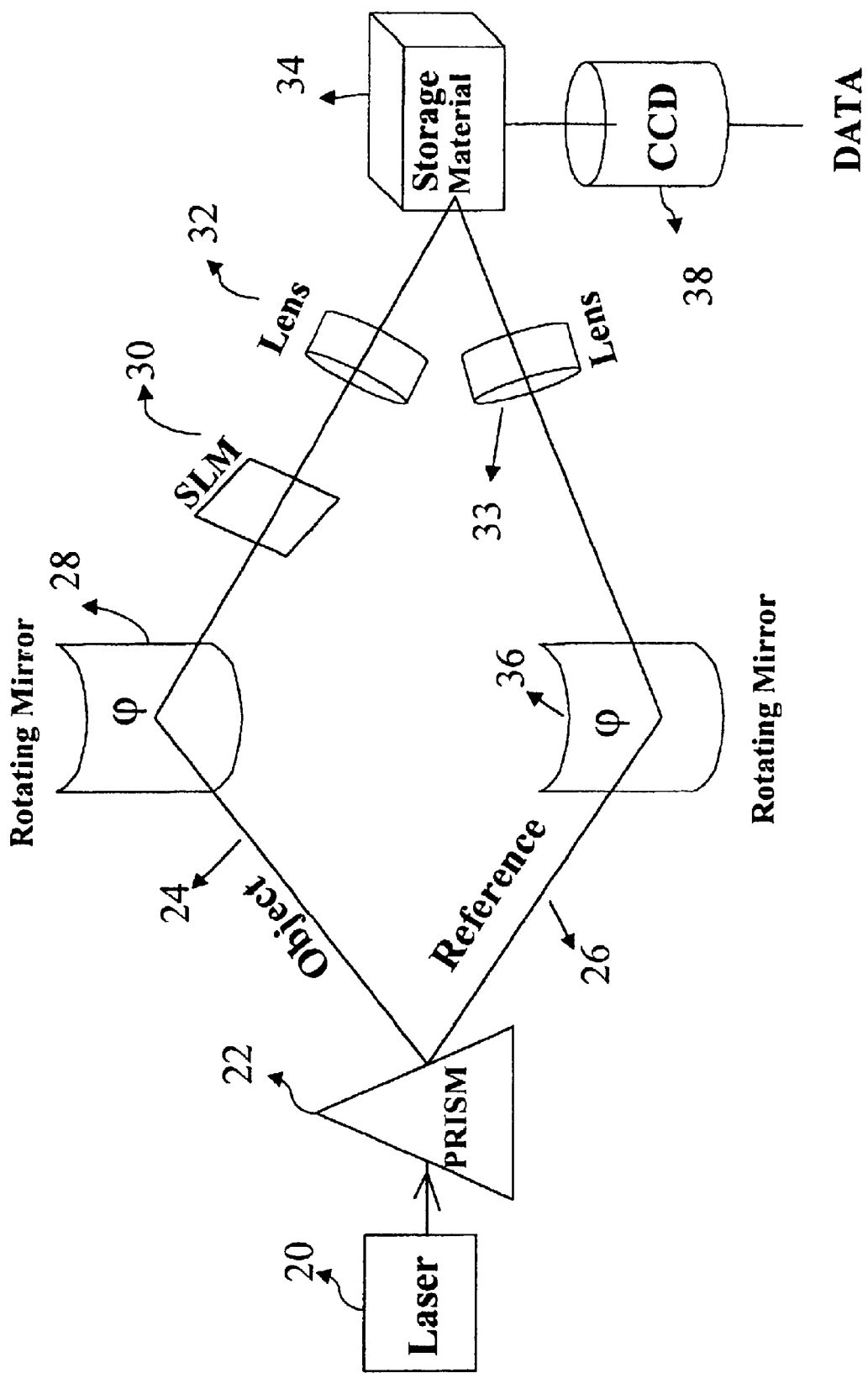
FIG. 1 is a block diagram of existing arrangements for optical storage.
Figure 2:
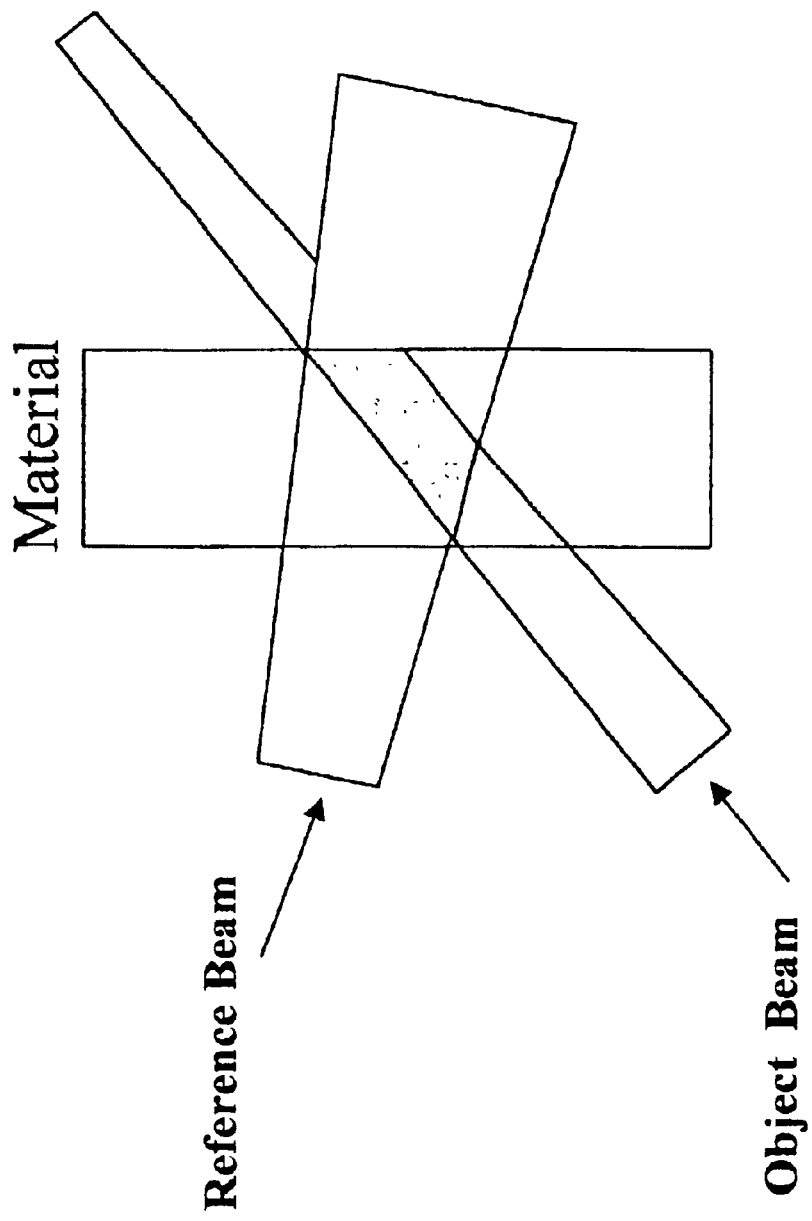
FIGS. 2 and 3 are representations of the creation of interference patterns or gratings in an optical storage medium and their read out.
Figure 3:
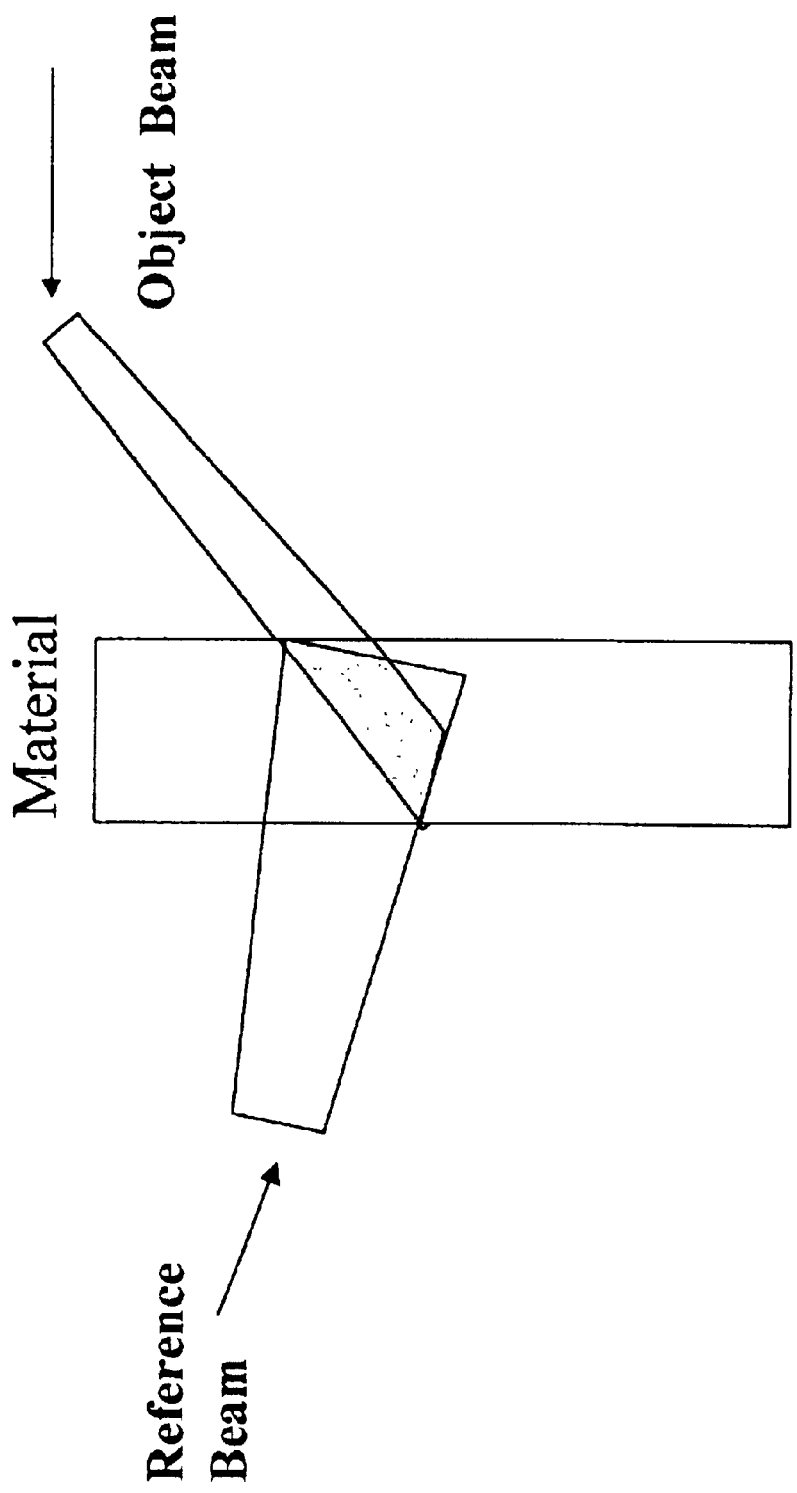

FIG. 1 represents prior optical data storage as optical interference patterns or hologram. Light from a coherent laser source 20 is split by a prism 22 into two beams, the object 24 and reference 26 beam. The data to be stored is used to make a matrix of light and dark points on a spatial light modulator (SLM) 30 which is illuminated by a reflection of the object beam from a mirror 28. The object beam from the SLM 30 is focused and transmitted to the recording medium 34. By superimposing the reference beam 26 at a specific angle from the object beam in the storage medium 34 one can create an interference pattern that is then used to store the data. A replica of the interference pattern is stored as a change in absorption, refractive index or thickness of the material. The storage medium 34 comprises a photosensitive material such as, a Fe doped LiNbO3 crystal, which stores optical information in the bulk area called virtual holographic storage area. Angular multiplexing may be employed to increase the amount of data stored in medium 34. With angular multiplexing the reference beam 26 angle with respect to the object beam is charged to allow the data from the SLM to be stored at different locations in the storage material. A large number of angles can be used to achieve very high-density storage. Any particular data can be read out from the storage medium by illuminating the stored grating with the reference wave that was used to store the data at the appropriate angle. When the stored interference grating is illuminated with one of the beams that were use during the recording, the stored grating diffracts some of this incident light such that the other beam is recreated. Illuminating the stored grating with the reference beam reconstructs the object beam and vice versa, as shown in FIGS. 2 and 3. A backward propagating or phase conjugated reference wave, illuminating the stored grating from the back side, reconstructs a data bearing object wave that propagates backward towards the original source. It has been shown that, as long as the holograms are distinguishable by the reference angle to the object beam or spacing of the grating the data can be read independently. The reconstructed object beam can be used to illuminate a charge coupled device 38 which converts the optical data to the electrical domain.

Figure 4:
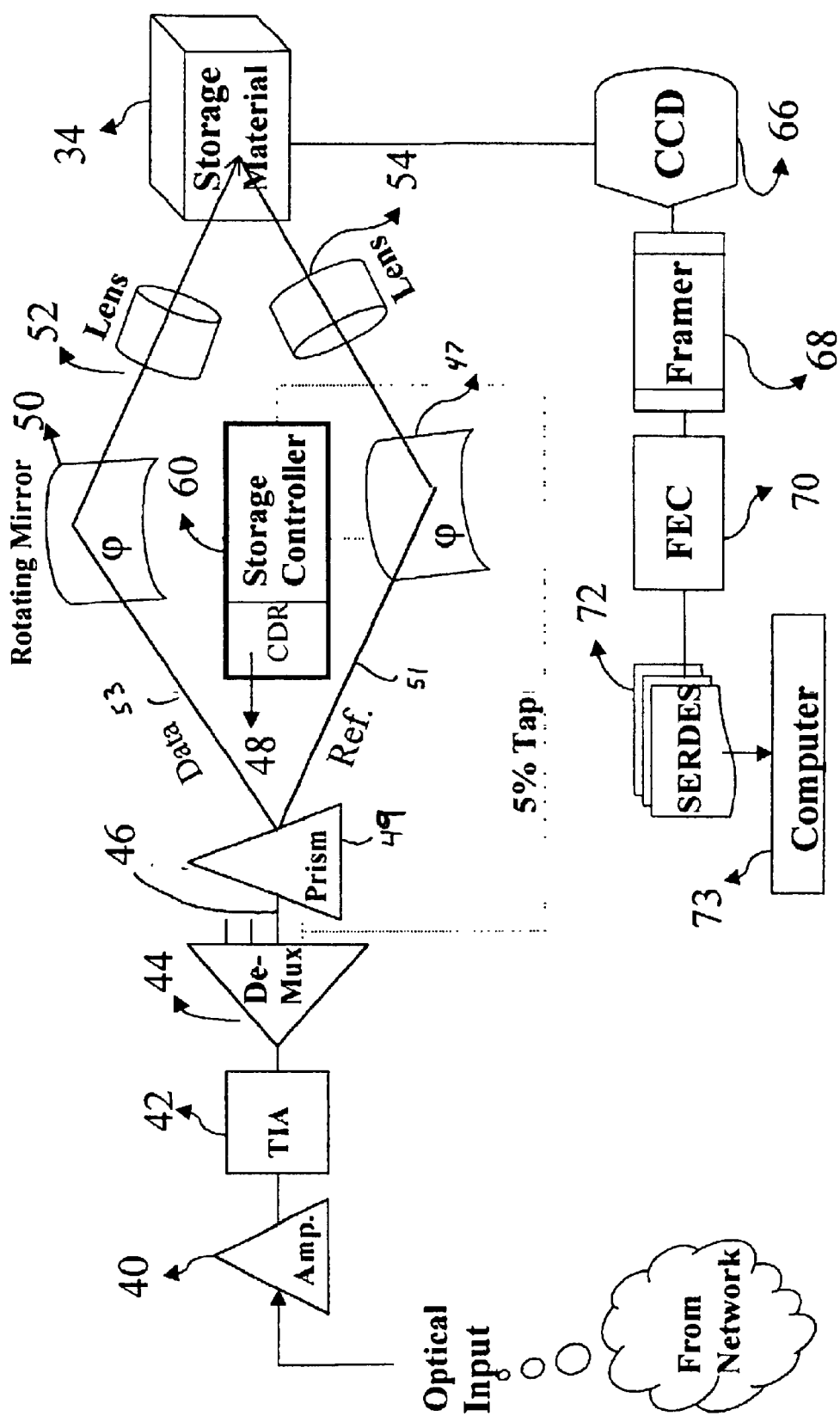
FIG. 4 is a block diagram of direct optical storage of optical network data.

FIG. 4 illustrates a receiver side of the optical-storage-digital (O/D) transducer. The optical signal is input from the network to an optical amplifier 40. The O/D Transducer is composed of components that normally are used in an optical receiver, such as the Trans Impedance Amplifier (TIA) 42 and a de-multiplexer 44. The de-multiplexer 44 is used to select a single wavelength data channel 46. De-multiplexer 44 also provides a small percentage top of the object beam and delivers that optical signal to a storage controller and clock and data secondary circuit 60. Other wavelength channels not selected by the de-multiplexer for use in FIG. 4 may be processed in the manner discussed by other similar arrangements. The signal 46 carrying optical data passes to a prism 49 which separates the object beam into two substantially identical beams 51 and 53. The reference beam 51 is transmitted to a mirror 47. The data bearing object beam 53 is transmitted to a mirror 50. The object and reference beams are coherent laser beams that are focused by lenses 52 and 54 respectively to intersect in the storage medium 34 and create an interference pattern in the photosensitive bulk crystal medium. Illuminating the stored interference pattern with the reference beam reconstructs the object beam and vice versa, as shown previously. It should be noted that the reference beam is reconstructed from the incoming serial optical data stream 46 which eliminates the need for laser control in the O/D. Further, interference patterns are created directly from the data bearing object beam, avoiding the need for providing and controlling an SLM. It should be mentioned that in a two state optical system one state is represented by light of the wave length of the source and the others may be represented by no light or a reduced amount of light at the same wave length. Thus storage will occur when the reference beam conveys light at the appropriate wave length. Should no light be present on the reference beam no light will be presented on the object beam. This will result in no interference patterns at the reference angle which absence will be detected by the CCD receiver and it can be assigned a data value e.g., zero.

Directing the reference beam onto the material and recreating the object beam contents to do the readout of data from the photosensitive volumetric material, allows the data to be retrieved to a Charge Coupled Device (CCD). At this point, the data has been converted into digital form that digital computers can manipulate. This is a currently accepted method to read the data and facilitate the conversion to digital imaging. The data is stored as individual pixels on the CCD, and the associated Bit Error Rates (BERs) can be calculated. A novel approach at this juncture is to position the SONET/Ethernet physical layer components for the Framer and Forward Error Correction (FEC) directly following the free space optics required for the hologram digital storage.

Angular multiplexing is used to differentiate one interference pattern in storage media 34 from another. As previously discussed, angular multiplexing is achieved by varying the angle of intersection of the object beam and the reference beam in the storage medium. In the embodiment of FIG. 4, the positions of mirrors 50 and 51 are varied for each data bit received on object beam 46. Thus, the interference patterns which are written on a per data bit basis are distinguishable from one another by a different angles between the object and reference beams. To control the optics necessary to properly record interference patterns storage controller 60 receives the 5% tap signal from de-multiplexer 44. The storage controller 60 responds to the synchronizing signals from de-multiplexer 44 by changing the angle between the object beam and the reference beam in synchronism with the bit pattern conveyed by the object beam. That is, each data digit of a stream of data digits is received in sequence for a predetermined period of time and the object beam/reference beam angle is changed for each data digit period. Such control is exercised in FIG. 4 by changing the settings of mirrors 47 and 50 on a digit-by-digit basis to achieve angular multiplexing. It should be mentioned that other embodiments could change the angle of the reference beam or change the angle of both the object and reference beams. The resulting sequence of interference patterns is thus recorded by a step wise or incremental sweep of the angle between object beam and reference beam. The data from the interference patterns can be recovered by duplicating such stepwise sweep of the reference beam. That is, it is not essential that the exact position and reference angle of each interference pattern be stored in memory because a search can be computed from known reference positions.

Data is read out from storage media 34 by applying the reference signal to the storage medium at the angles used during the writing operation. As shown in FIG. 4 the read out patterns are applied to a change coupled device (CCD) 66 which converts them to an electronics format and applies them to a frame 68 to properly organize the bytes, word and frame structures of received data and to a forward error correcting circuit (FEC) 70 which corrects the data as received, stored and read. It is significant to note that by locating the FEC 70 after storage and retrieval, errors in storage and read out as well as transmission errors will be corrected. After error correction the recovered data is available for access by a host computer 72. In the preceding embodiment the storage controller 60 is shown as a unit separate from computer 72. In other embodiments the storage computer functions may be incorporated into host computer 72 or other control devices.

The preceding Figs. show drawn lines between various devices to illustrate the transmission of optical beams. It is to be understood that beams such optical beams may be transmitted using guide media in the nature of optical fiber or they may be transmitted as free space optics. Advantageously, free space optics may be employed for other interconnects in the apparatus.

Figure 5:
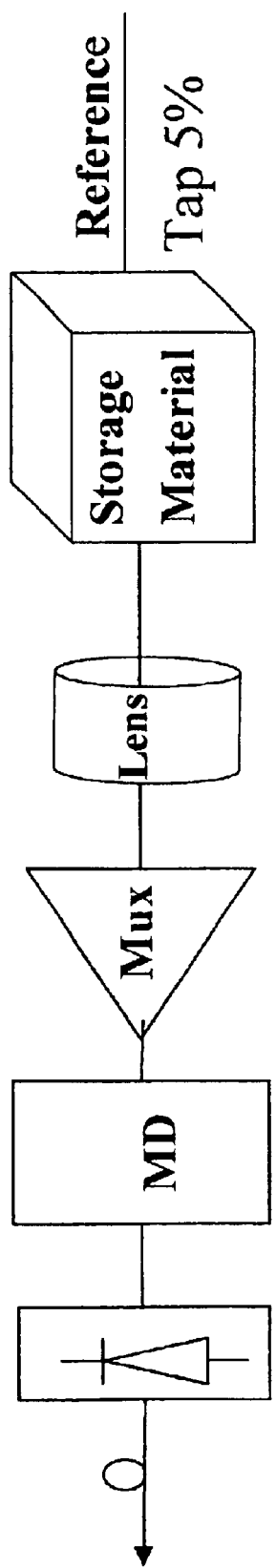
FIG. 5 is a diagram of data read out from an optical storage medium.

When data to be transferred over the network has been stored in medium 34 with the PHY layer framing and error correction appropriate for the particular application the data can be transmitted on the network as shown in FIG. 5. The disclosures above discuss the SONET/Ethernet PHY and FEC as an example.

The O/D Transducer requires at least one incoming optical data stream a signal to perform the transmitter operations that include reading information or data from the photosensitive material and/or transmitting onto an optical network.

Figure 6:
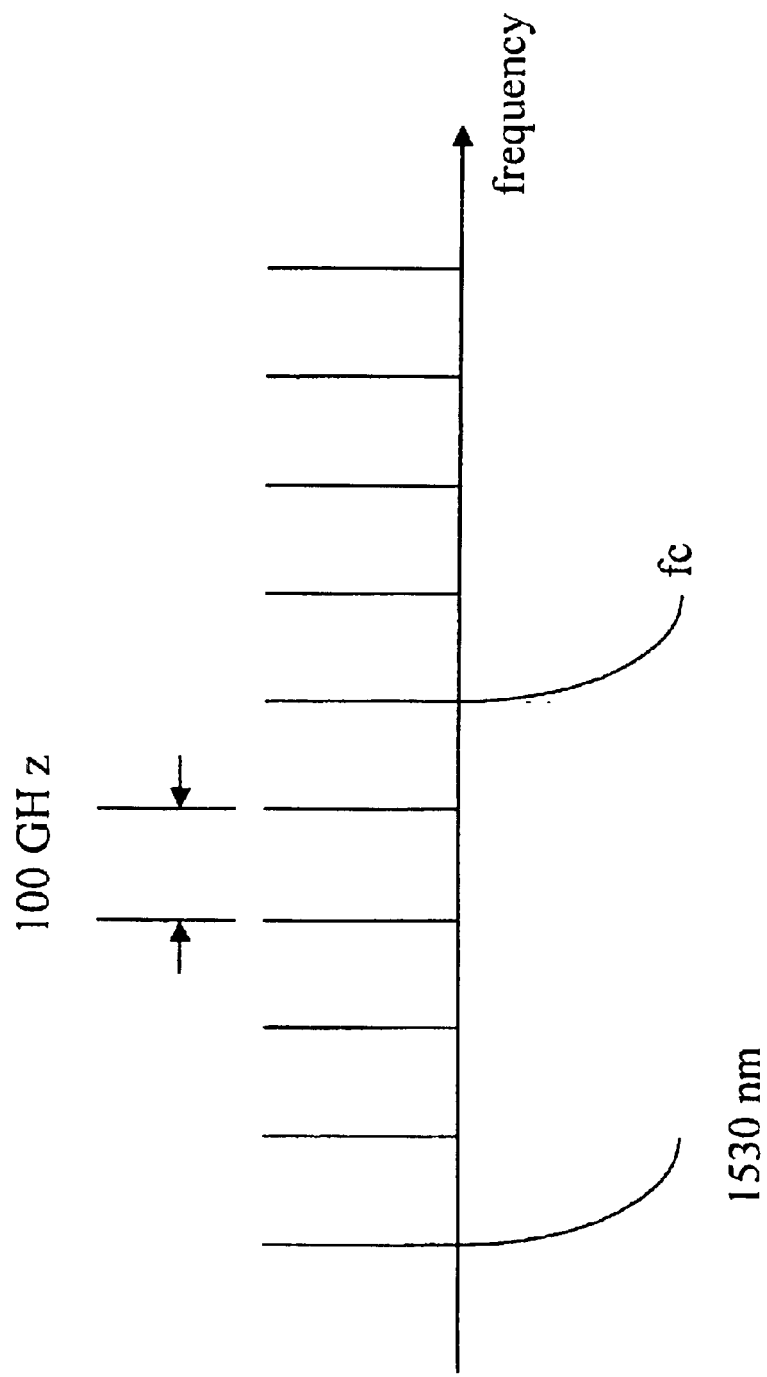
FIG. 6 is a representation of wave length separated channels employed for optical communication.
Figure 7:
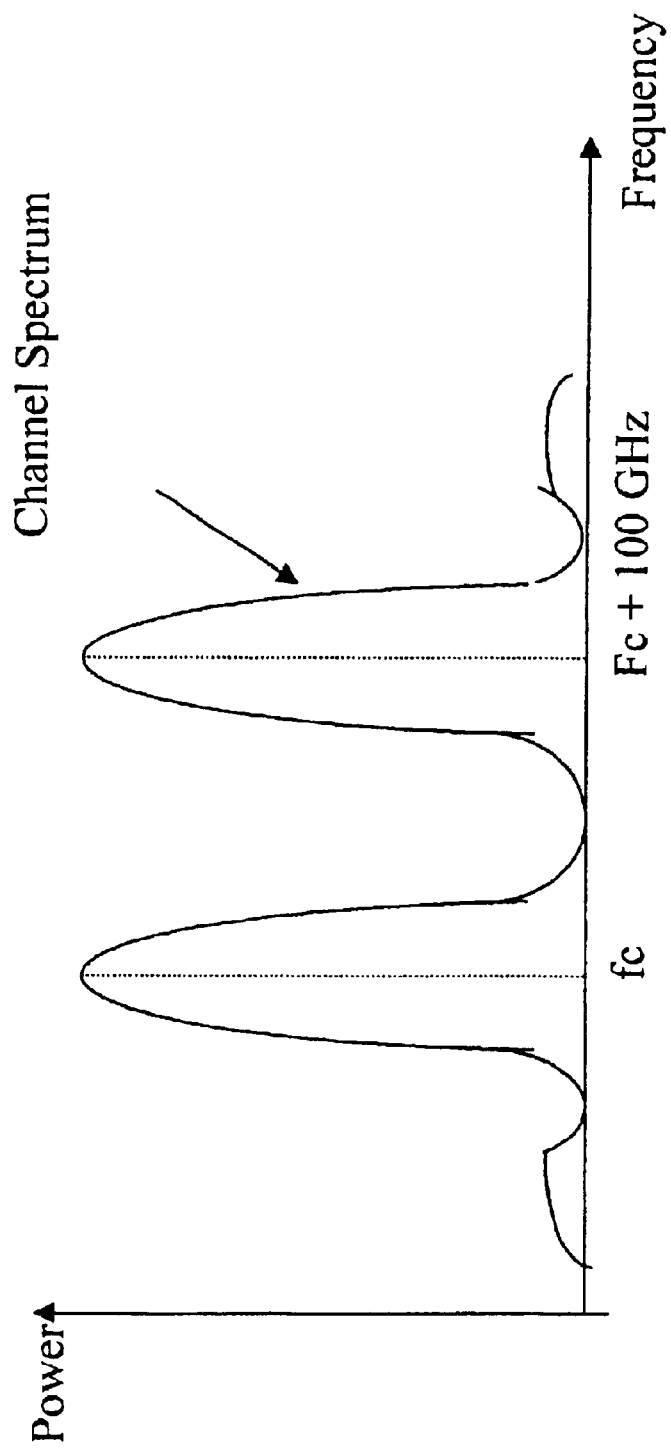
FIG. 7 is a power versus frequency diagram of adjacent ones of the optical channels represented in FIG. 6.

In the previous embodiment single incoming data stream is present and the storage density in the photosensitive volumetric material was achieved by angle multiplexing. Advantageously, angle multiplexing may be combined with frequency or wavelength multiplexing to provide the spacing between the gratings or refractions in the storage material by changing the incidence angle and wavelength of the object and/or reference(s) beams. Wavelength Multiplexing data streams provides many orders of magnitude improvement in speed and density when storing data in photosensitive volumetric material. The SONET-Ethernet/DWDM data streams provide a practical source for the needed input signals. Dense Wavelength Division Multiplexing (DWDM) transmission systems align their signal laser frequencies to an internationally defined standard called the International Telecommunication Union (ITU) grid. FIG. 6 illustrates 10 channels on this grid. The illustration shows channels with 100 GHz spacing and a starting optical frequency of 1550 nm for channel #1. Regarding this discussion on frequency spacing, please note the frequency channel fc in FIG. 7. We usually describe frequency spacing as shown in FIG. 7, where frequency fc is centered on the peak of the channel and frequency fc+100 GHz would constitute the peak of the next signal and channel.

Figure 8:
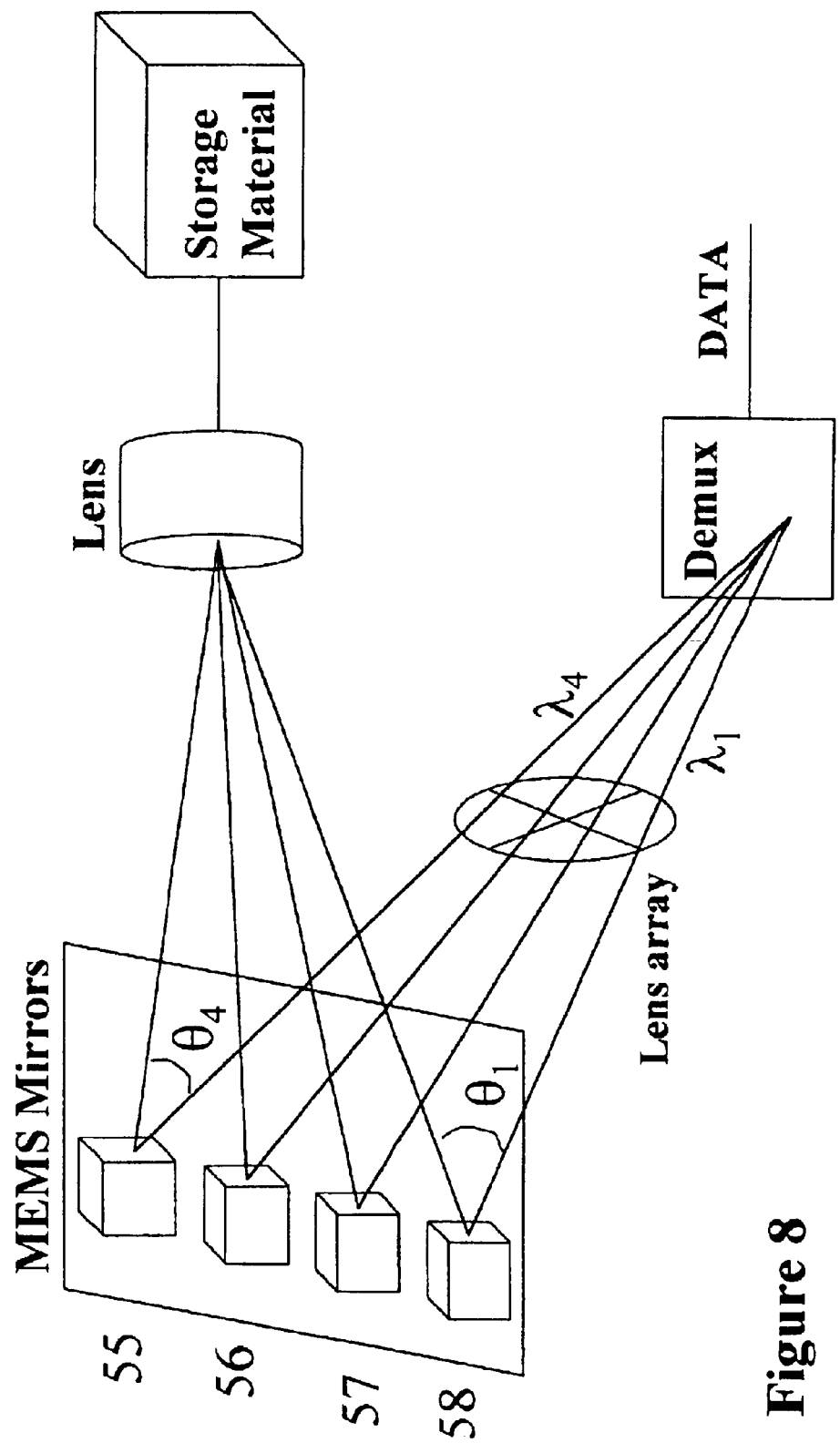
FIG. 8 is a representation of the use of microelectromechanical (MEMS) in optical systems.

Microelectromechanical systems (MEMS) technology has been extended to integrate many mirrors on the same chip, arranged in an array. Based on this technology, each mirror, connected with a micromachine electrical actuator, may be independently tilted so that the independent light beam is reflected in the desired direction. When a specific voltage is applied to each mirror in the array of actuator, the mirrors are deflected at different controlled angles. Thus, an array of N mirrors can direct N optical input signals impinging on them, to reflect to N positions in space. MEMS devices can be used in embodiments of the optical storage system to define the angle of both the object and reference beams and directing them onto the holographic storage material. FIG. 8 illustrates a design for achieving read/write employing MEMS devices. The position of each mirror 55–58 relative to the storage medium 34 and incident beam for each wavelength creates a solid angle that is used for addressing the data being stored or read out. A grating can be used to achieve similar configuration. Concurrently, by superimposing a reference beam onto the object beam the data can be stored as an interference pattern in a specific location in the material. Reading occurs by simply blocking the light hitting the photosensitive material from the object beam and projecting onto the material the reference wavelength that was used to create the interference pattern as shown previously. For the first level of capacity, a specific voltage V, applied to each mirror within the MEMS array will produce M number specific angles of incidence. Because the mirror array itself does not have to be rotated as is done in other methods of angular multiplexing, the data can be read faster and with much higher fidelity. For much greater capacity, one can combine frequency or wavelength multiplexing with MEMS technology. Using cross-correlation techniques, each wavelength can be retrieved without interference from other optical information previously stored in the material.

Figure 9:
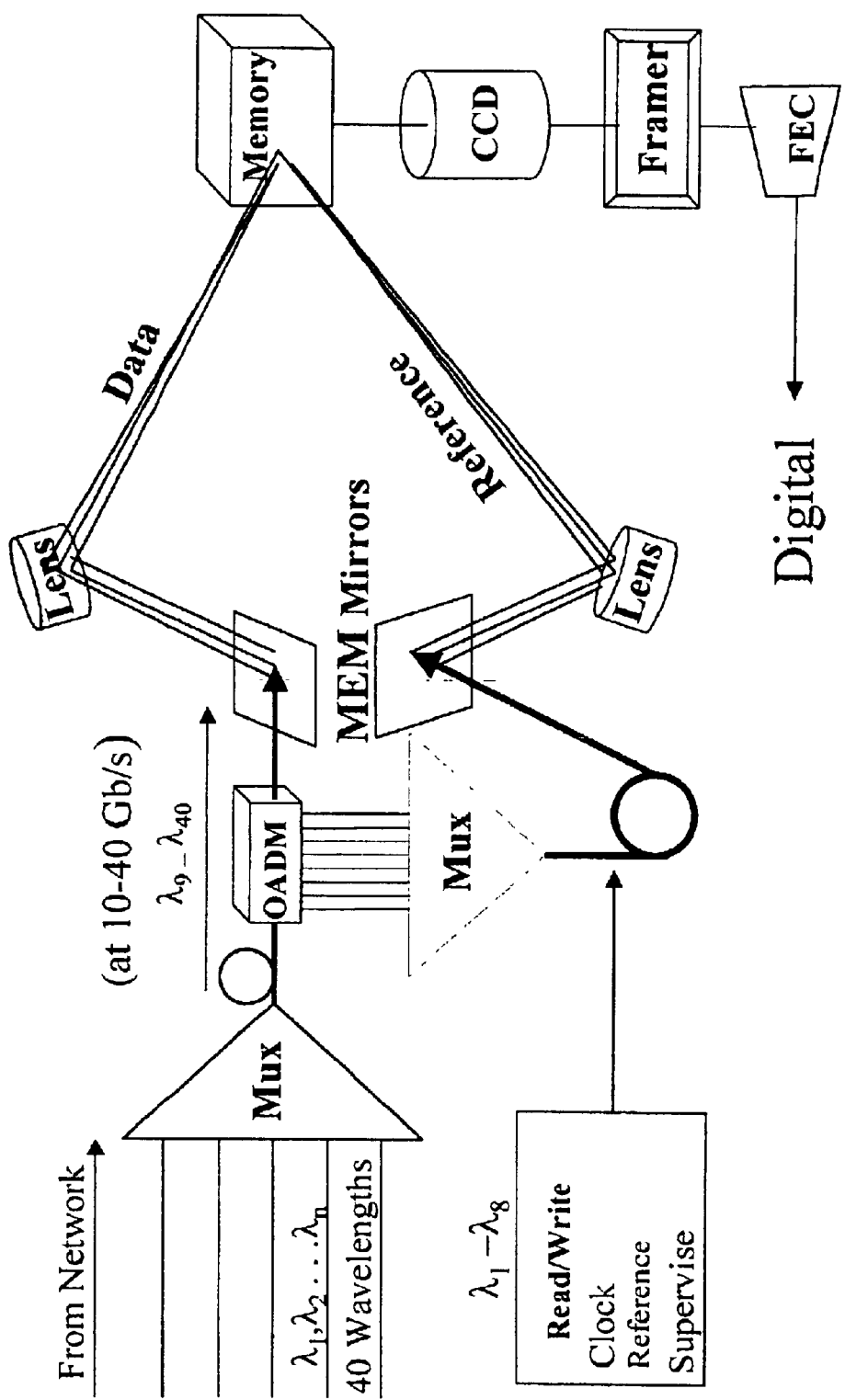
FIG. 9 represents an embodiment of an optical storage system employing angular and wavelength modulation.

In FIG. 9, a signal consisting of multiple wavelengths from a DWDM system transport data from a network.

In this system 40 wavelengths are multiplexed at OC-192 (10 Gb/s) giving rise to 400 Gb/s per fiber. In addition, 80, 120 wavelengths at OC-768 (40 Gb/s) giving rise to 3.2 Tb/s and 6.4 Tb/s bandwidth can be made available to achieve additional capacity. In the example shown here, the data is aggregated into 8 wavelengths/channel selected by a de-multiplexer 64. An optical add-drop multiplexer 66 is used to divert a full aggregate of 8 wavelengths to be used as reference, clock and other data management. The optical add-drop multiplexer is a fixed OADM whose function in this embodiment is to connect the selected wavelengths for use as reference for read and write operation in the manner discussed above. As the technology for photonics OOO switches matures, they can replace conventional OADM in this configuration, as it will be easier to integrate with MEMS technology used here. The data is recorded in the holographic memory storage 34 and fed into the SONET Framer and FEC to remove the framing, perform pointer processing and error correction. This Terabit data plays the role of a buffer and then transmit the data at 2.5 Gbit/sec which passed onto the memory bus of the digital computer.

Figure 10:
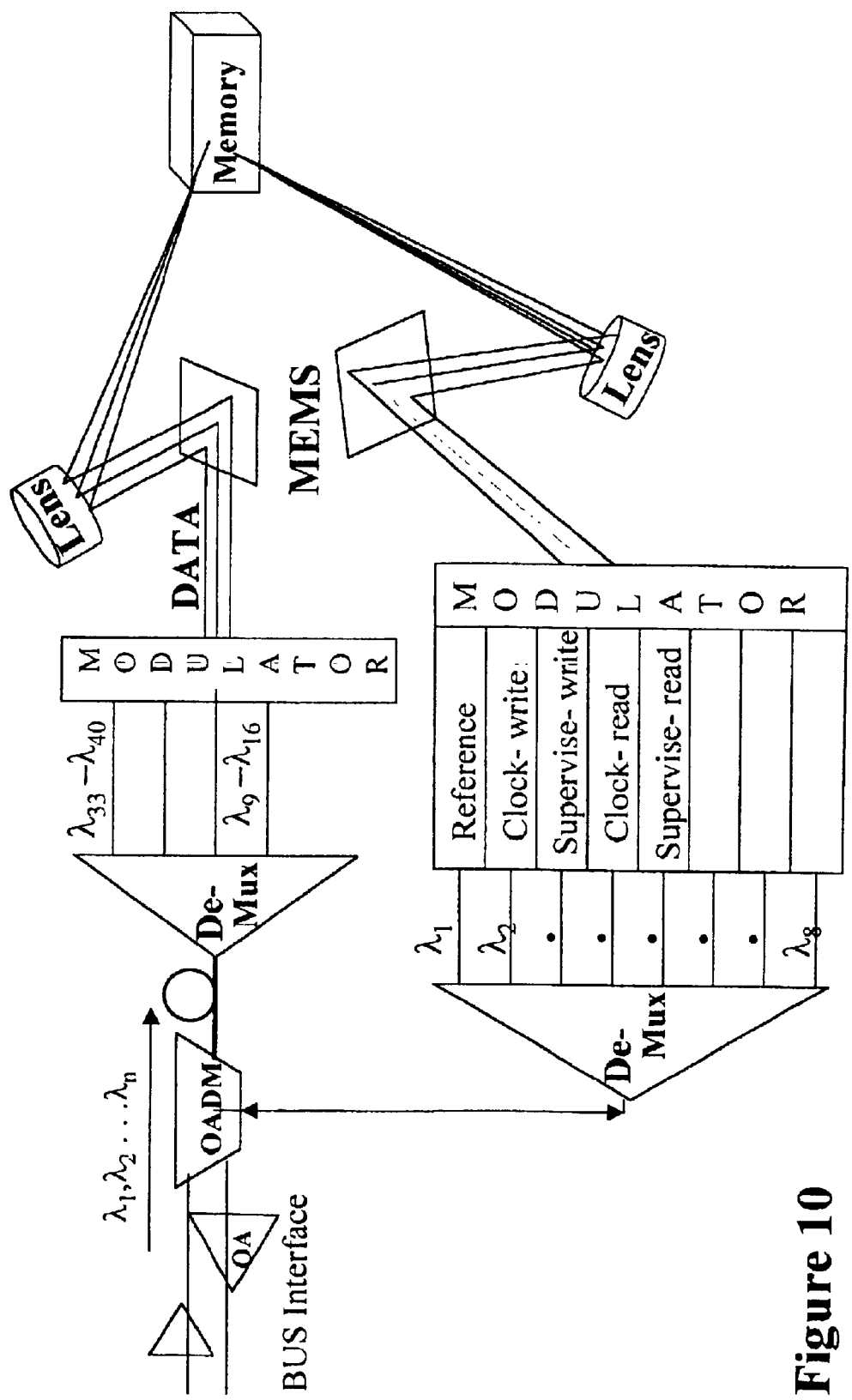
FIG. 10 represents another embodiment of an optical storage system employing angular and wavelength modulation.
Figure 11:
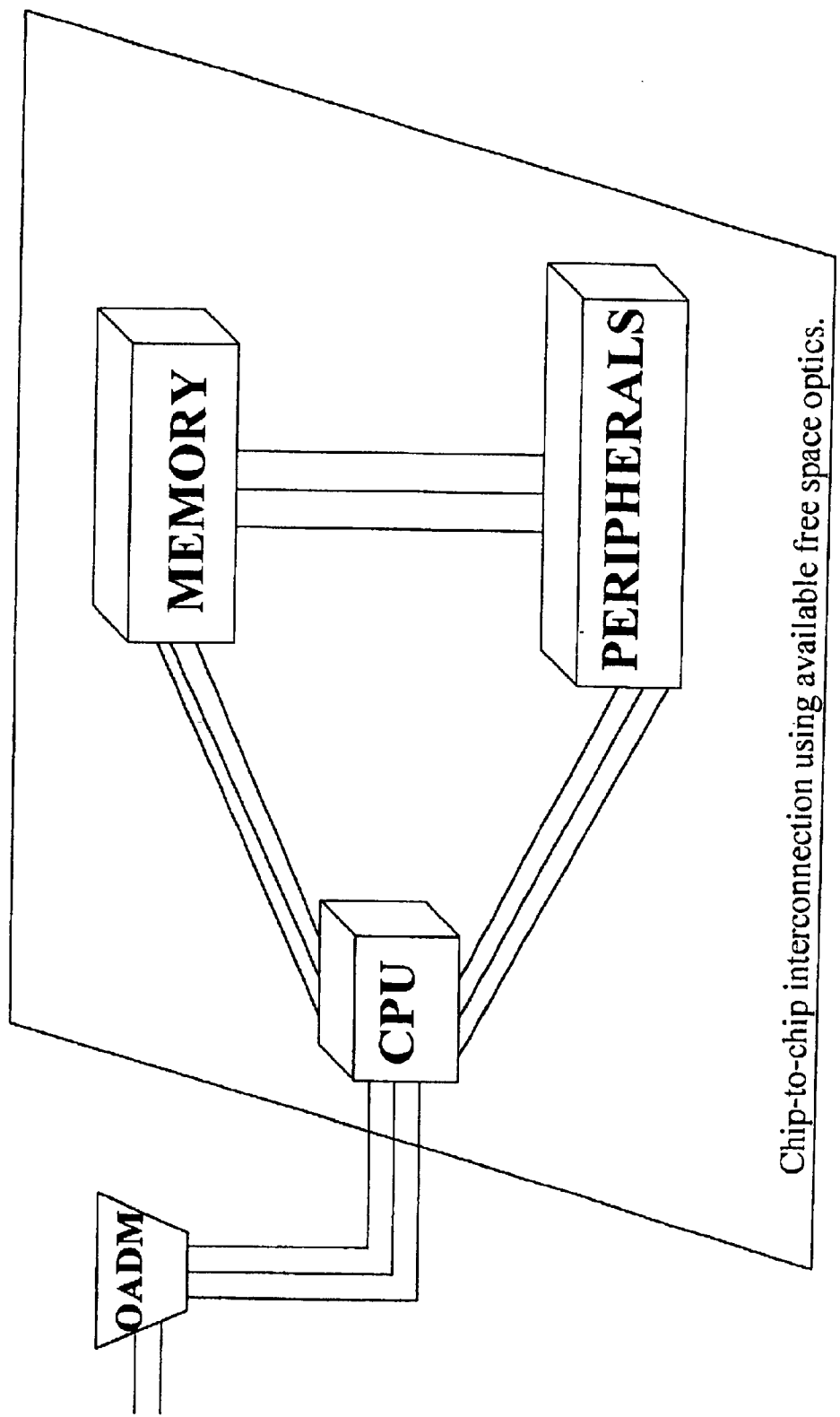
FIGS. 11 and 12 are representations of free space optically coupled arrangements for use in high speed optical data storage systems.
Figure 12:
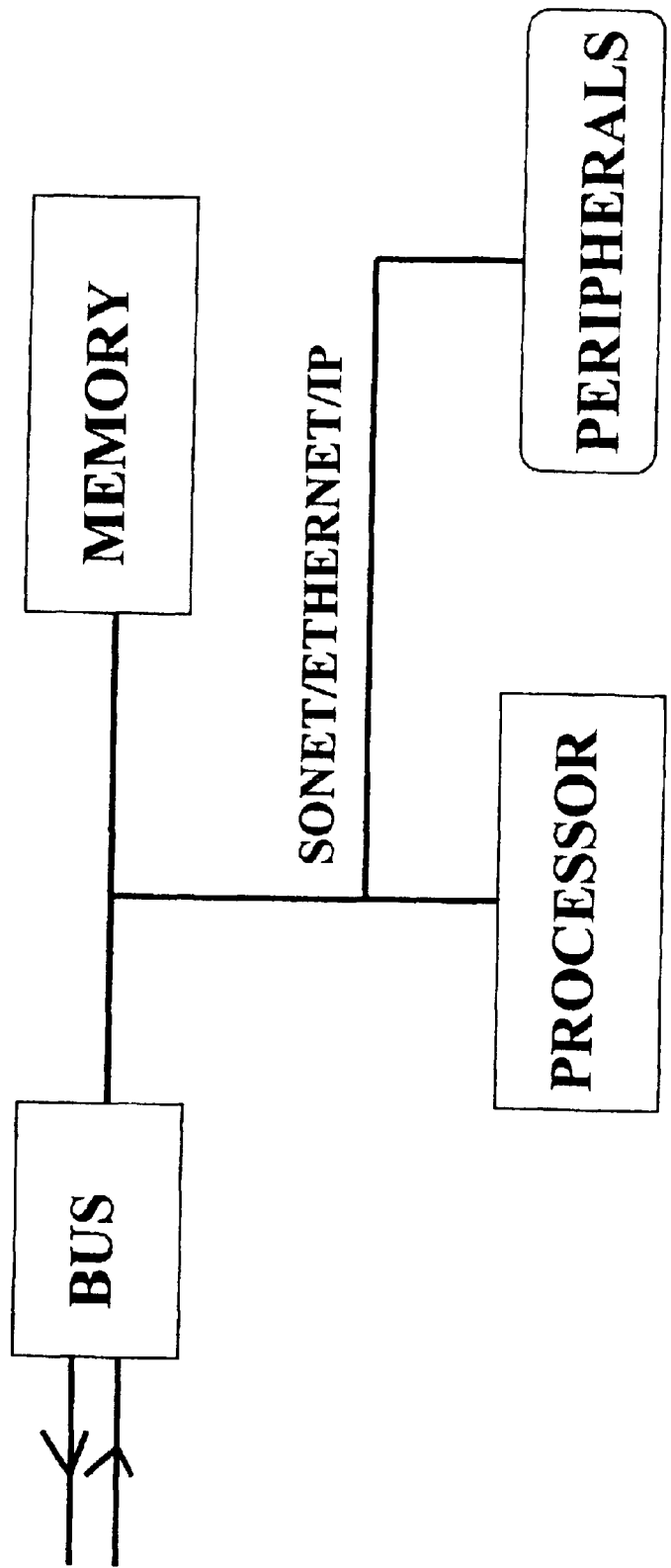

FIGS. 10 and 12 are representations of the high density device taking advantage of higher network speeds, wave length division multiplexing and free space optics between components. These configurations allow for direct reading and writing of the data from the network at whatever speed the network operates. The memory device in the FIG. 10 embodiment is 1 Terabyte in density and non-volatile. By using higher speed network (40 gb/s) and taking advantage of wavelength division multiplexing and available free space optics, one can achieve memory density of 64 terabytes or higher.

We claim:

1. A method of optical storage of optical data in a storage medium comprising:

receiving a first serial stream of a sequential series of data digits in optical format;

generating a gating signal in substantial synchronism with the successive data digital of the optical data stream;

generating a reference optical signal;

directing the first optical data stream toward the storage medium;

directing the reference toward the storage medium at a first angle from the optical data stream and intersecting the optical data stream in a volume of the storage medium; and in response to the gating signal, changing the first angle between the reference beam and the optical data in substantial synchronism with the successive data digits of the optical data stream.

2. A method of optical storage in accordance with claim 1 wherein the generating a reference optical signal comprises generating the reference optical signal in response to the serial stream of optical digits.

3. A method of optical storage in accordance with claim 1 wherein the first serial stream comprises optical digits at a first wavelength and the method of storage comprises:

receiving a second serial stream of a sequential series of binary digits in optical format at a second wavelength.

4. A method of optical storage in accordance with claim 3 comprising, storing the digits of the second serial stream as interference patterns in the storage medium.

5. A method of optical storage in accordance with claim 1 comprising reading one or more data digits from the storage medium.

6. A method of optical storage in accordance with claim 1 wherein the step of changing the first angle comprises controlling a MEMS to change the first angle.

7. A method of optical storage of optical data in a storage medium comprising:

receiving a stream of optical data digits from a transmission network;

directing the received stream of optical data digits into the storage medium; and directing a reference optical beam at a predetermined angle to the storage medium to intersect the stream of optical data digits and create an interference pattern in the storage medium;

adjusting the predetermined angle in increments during the performance of the step of directing the received stream of optical data digits.

8. A method of optical storage in accordance with claim 7 wherein the increments of adjusting the predetermined angle are moved in synchronism with the data digits of the optical data stream.

9. A method of optical storage in accordance with claim 7 wherein the step of receiving a stream of optical data digits comprises receiving a plurality of streams of optical data digits at different wavelengths and selecting at least a first of the received optical data streams for storage.

10. A method of optical storage in accordance with claim 9 comprising storing in the storage medium interference patterns generated from one of the optical data streams other than the first optical data stream.

11. A method of optical storage in accordance with claim 9 comprising storing in the storage medium, interference patterns generated from multiple data streams concurrently.

12. An arrangement for optical storage of optical data in a storage medium comprising:
   a first serial stream of a sequential series of data digits in optical format;
   a gating signal generator providing a gating signal in substantial synchronism with the successive data digits of the optical data stream;
   a reference signal apparatus for generating a reference optical signal;
   first optical apparatus directing the first optical data stream toward the storage medium;
   second optical apparatus directing the reference optical signal toward the storage medium at a first angle from the optical data stream to intersect the optical data stream in a volume of the storage medium; and
   apparatus for changing, in response to the gating signal, the first angle between the reference beam and the optical data stream in substantial synchronism with the successive data digits of the optical data stream.

13. An arrangement in accordance with claim 12 wherein the reference optical signal apparatus generates the reference optical signal in response to the serial stream of optical digits.

14. An arrangement in accordance with claim 12 wherein the optical storage medium stores the digits of the first serial stream as interference patterns in the optical storage medium.

15. An arrangement in accordance with claim 12 wherein the first serial stream comprises optical digits at a first wavelength and the optical storage arrangement comprises:
   a second serial stream of a sequential series of binary digits in optical format at a second wavelength.

16. An arrangement in accordance with claim 15 wherein the storage medium stores the digits of the second serial stream as interference patterns in the storage medium.

17. An arrangement in accordance with claim 12 comprising apparatus for reading one or more data digits from the storage medium.

18. An arrangement in accordance with claim 12 wherein the apparatus for changing the first angle comprises controlling an optical MEMS device to change the first angle.

19. An apparatus for optical storage of optical data in a storage medium comprising:
   a serial stream of optical data digits from a transmission network:
   second apparatus for optically directing the received stream of optical data digits into the storage medium; and
   directing a reference optical beam at a predetermined angle to the storage medium to intersect the stream of optical data digits and create an interference pattern in the storage medium;
   intersection control apparatus for controlling an angle of intersection of the reference beam and the stream of optical digits, the intersection control apparatus further comprising optical apparatus for adjusting the intersection angle in increments.

20. A method of optical storage in accordance with claim 19 wherein the increments of adjusting the predetermined angle are moved in synchronism with the data digits of the optical data stream.

21. An arrangement in accordance with claim 19 comprising a plurality of serial streams of optical data digits at different wavelengths and optical apparatus for selecting at least a first of the received optical data streams for storage.

22. An apparatus in accordance with claim 21 wherein the storage medium stores, interference patterns generated from multiple data streams concurrently.

* * * * *